July 10, 1923 Re. 15,651
A. STUBER
FLUID MEASURING AND INDICATING MECHANISM
Original Filed Oct. 7, 1916 4 Sheets-Sheet 1
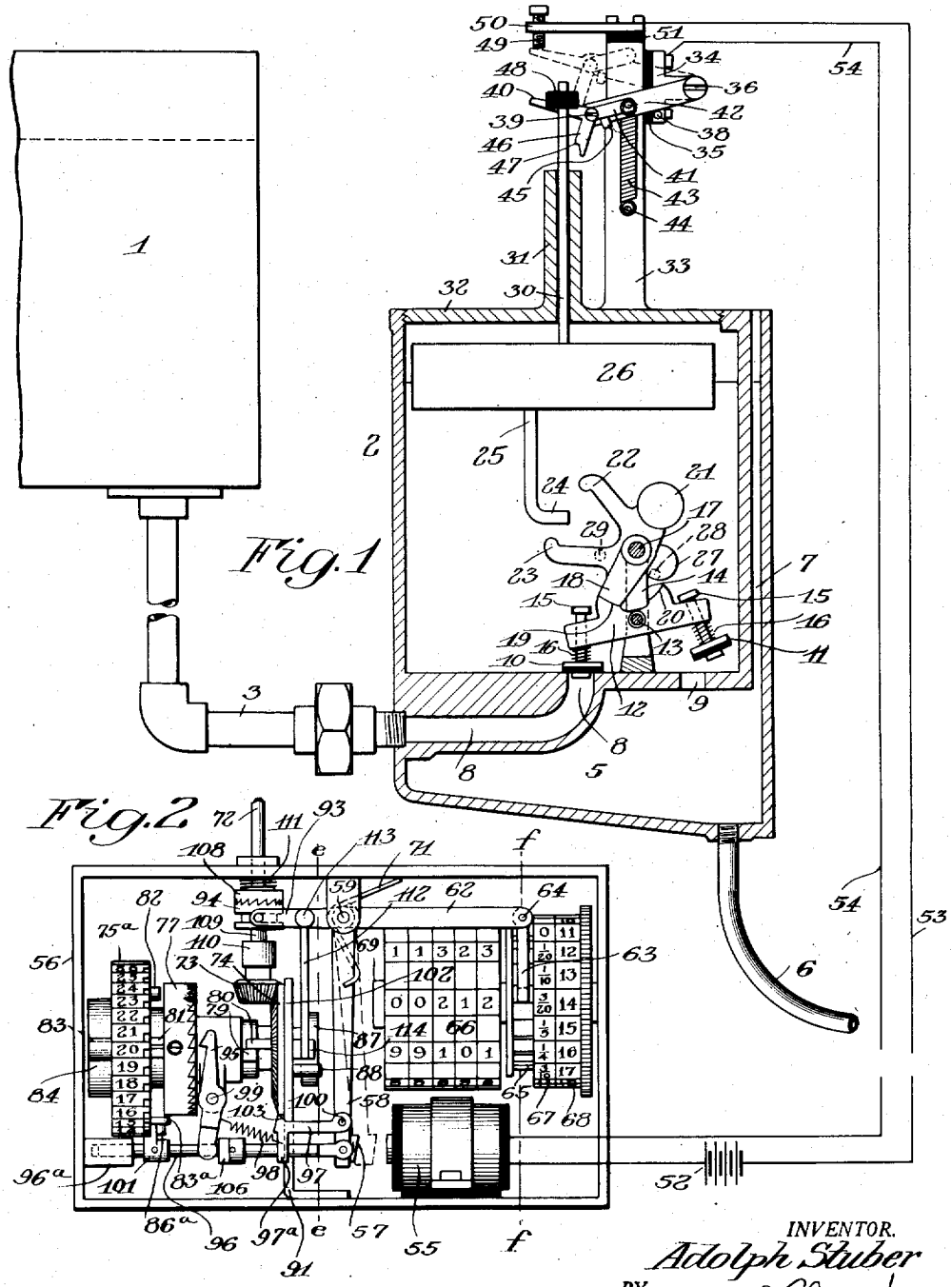
INVENTOR.
Adolph Stuber
BY
Frederick S. Church
his ATTORNEY July 10, 1923. Re. 15,651

A. STUBER

FLUID MEASURING AND INDICATING MECHANISM

Original Filed Oct. 7, 1916 4 Sheets-Sheet 2

INVENTOR.
Adolph Stuber
BY
Sidney S. Church
his ATTORNEY

July 10, 1923 Re. 15,651
A. STUBER
FLUID MEASURING AND INDICATING MECHANISM
Original Filed Oct. 7, 1916 4 Sheets-Sheet 3
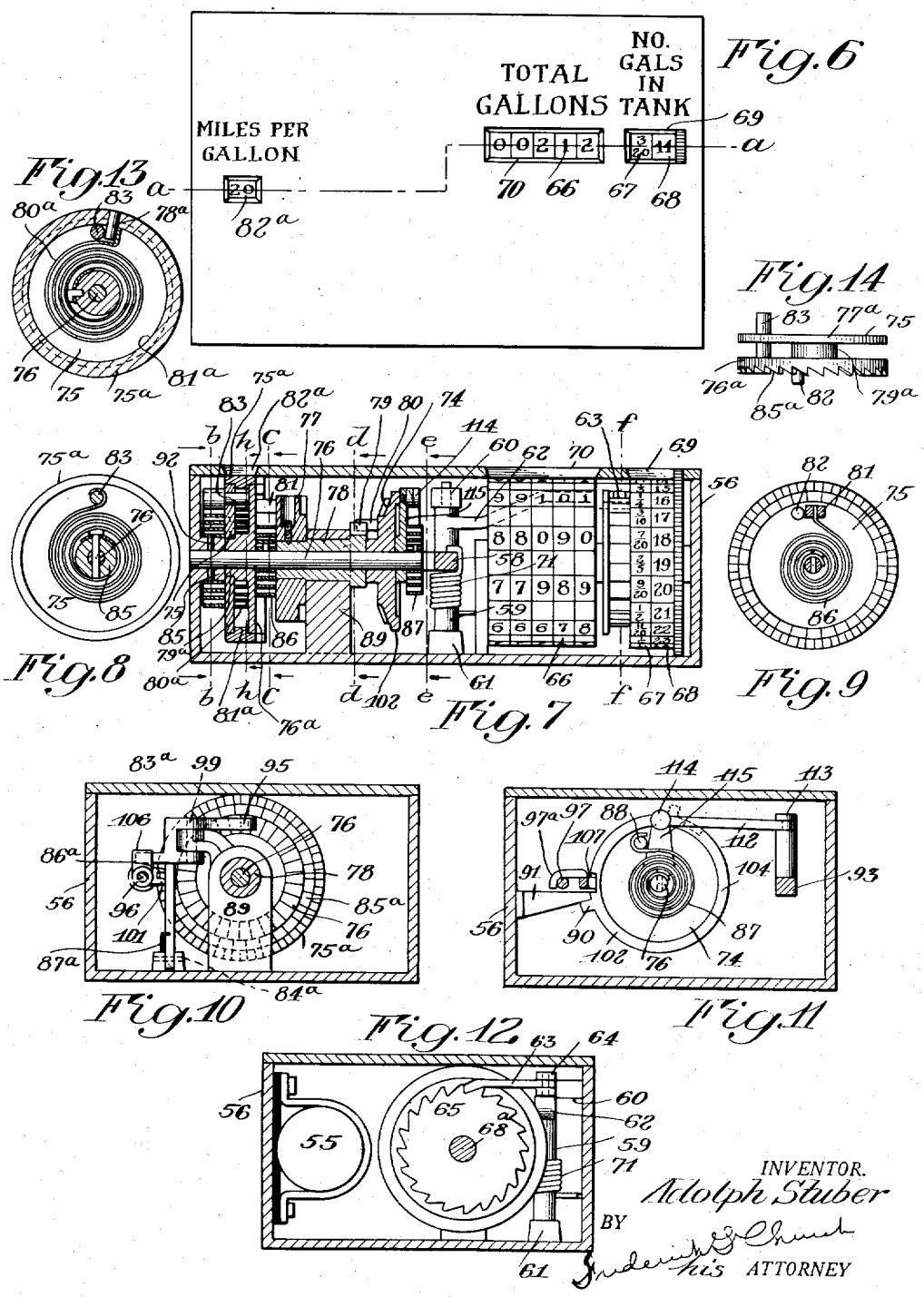
INVENTOR.
Adolph Stuber
BY
Frederick G. Church
his ATTORNEY July 10, 1923

Re. 15,651

A. STUBER

FLUID MEASURING AND INDICATING MECHANISM

Original Filed Oct. 7, 1916

4 Sheets-Sheet 4

INVENTOR.
Adolph Stuber
BY
Frederick G. Chunt
his ATTORNEY

Reissued July 10, 1923. Re. 15,651

UNITED STATES PATENT OFFICE.

ADOLPH STUBER, OF ROCHESTER, NEW YORK.

FLUID MEASURING AND INDICATING MECHANISM.

Original application filed October 7, 1916, Serial No. 124,220. Renewed December 19, 1919, Serial No. 346,174. Original No. 1,355,183, dated October 12, 1920. Application for reissue filed July 11, 1922 Serial No. 574,296.

*To all whom it may concern:*

Be it known that I, ADOLPH STUBER, of Rochester, in the county of Monroe and State of New York have invented certain new and useful Improvements in Fluid Measuring and Indicating Mechanisms; and I do hereby declare the following to be a full, clear, and exact description of the same, reference being had to the accompanying drawings, forming a part of this specification, and to the reference characters marked thereon.

My invention has for one of its objects to provide mechanism for determining the ratio in distance travel per unit of liquid fuel consumed by engine driven vehicles. A further object of the invention is the provision of mechanism for periodically dispensing predetermined amounts of liquid fuel to be used by a liquid consuming element and automatically registering said amounts by a suitable mechanism. A still further object of the invention is to provide a valve mechanism controlled by the rise and fall of liquid fuel in a tank for dispensing liquid therefrom and causing the energization of a magnet to operate a mechanism adapted to register the amount of fuel dispensed from the tank. A still further object of the invention is to provide an indicating device driven by a movable part of the vehicle from a predetermined starting point and arranged to be released by the operation of a fuel unit measuring device to be returned to said starting point at the end of each fuel unit consumption period. To these and other ends the invention consists in certain improvements and combinations of parts, all as will be hereinafter more fully described, the novel features being pointed out in the claims at the end of the specification.

In the drawings:

Figure 1 is an elevational view partly in section embodying one form of the liquid controlling apparatus;

Figure 2 represents a top plan view of the counter or registering mechanism with the casing cover removed showing the parts in normal position;

Figure 6 is a top plan view of the counter mechanism casing through the cover of which the counter or registering wheels are visible;

Figure 7 is a sectional view taken on line *a—a* of Figure 6;

Figure 8 is a sectional view taken on line *b—b* of Figure 7 with the casing omitted;

Figure 9 is a sectional view taken on line *c—c* of Figure 7 in which the casing is also omitted;

Figure 10 is a transverse sectional view through the casing taken on line *d—d* of Figure 7;

Figure 11 is a sectional view through the casing taken on line *e—e* of Figure 2;

Figure 12 is a sectional view taken on line *f—f* of Figure 2;

Figure 13 is a sectional view taken on line *h—h* of Figure 7;

Figure 14 is a detail plan view of the operating member for the indicating ring shown in Figure 13;

Similar reference characters throughout the several views indicate the same parts.

Figure 3:
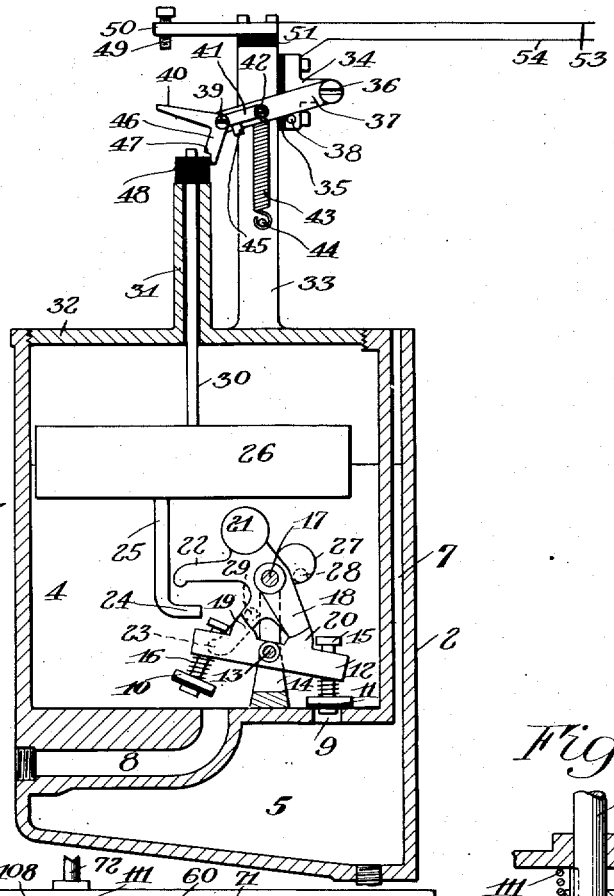
Figure 3 is a sectional view similar to Figure 1 showing the float moved to its lowest position to cause the opening of the intake valve and the closing of the outlet valve.

In automobiles and other vehicles propelled by explosive or hydrocarbon engines it is desirable to be able to determine at a glance the ratio in miles per gallon of liquid fuel being consumed by the engine and the present invention has been designed for this purpose. The mechanism is also arranged so as to register the total amount of gasolene or other liquid fuel used by the engine as well as to indicate to the driver of the machine the amount of unconsumed fuel on hand from time to time.

From the indicating or registering wheel showing the ratio in miles per gallon or unit of liquid fuel consumed by the engine may also be read the actual distance traveled by the machine for each unit of fuel consumed since said wheel will be released at the end of each fuel-unit consumption period and at that time the numeral indicated thereon will represent both the ratio in miles per gallon of fuel consumed as well as the whole or fractional part of a mile actually traveled by the vehicle during said consumption period.

Mechanism is also provided whereby if the machine is running down grade with the power shut off the several registering mechanisms will be prevented from registering while there is no consumption of fuel.

Means is also provided for preventing the operation of the registering mechanism when the machine is being driven backward.

The invention comprises broadly an indicating device driven by a movable part of the machine for determining the ratio in distance traveled per unit of fuel consumed, which is movable from a predetermined position and returnable thereto when released by a magnet controlled by and energized at the time of operation of a fuel unit measuring device interposed between the fuel supply source and the engine. In conjunction with said releasing mechanism another register or counter mechanism is provided and operated by said magnet simultaneously with said release to indicate the amount of liquid fed through the supply tank and the amount remaining therein at any given time.

The invention is also applicable to power driven machines of different classes other than vehicles where it is desired to determine the ratio in work done per unit of fuel consumed, as in the case of determining the number of revolutions of a driven shaft for each unit of fuel consumed.

Referring to the drawings by numerals, 1 represents a gasolene or liquid fuel supply tank such as is used on automobiles or other motor driven vehicles. The tank 1 may be elevated with respect to a gasolene measuring or controlling tank 2 and is connected with the latter by means of suitable piping as indicated at 3, through which the liquid is fed to the dispensing or controlling tank preferably by the action of gravity. The tank 2 is provided with a fuel controlling or measuring chamber 4 beneath which is positioned a receiving or overflow chamber 5 from which extends the supply pipe 6 for furnishing gasolene to the carbureter of the engine (not shown). The chamber 5 is provided with a passageway 7 whereby liquid in the chamber is brought under atmospheric pressure and fed through the pipe 6 to any desired point, preferably to the carbureter to be consumed by the engine or motor. Leading from the pipe 3 to the measuring chamber 4 is an intake passageway 8 through which the gasolene or other liquid fuel is discharged into said chamber and leading from the chamber is a discharge passageway 9 communicating with the receiving chamber 5. The passageways 8 and 9 are controlled by the intake and outlet valves 10 and 11 respectively, which are loosely mounted upon the opposite ends of the rocker 12 pivoted at 13 between the spaced uprights 14 seated upon the bottom wall of the chamber. The inlet and outlet valves 10 and 11 are carried by the bolts 15 which are loosely mounted upon the arms of the rocker. Springs 16 are mounted on the bolts between the valves and the rocker arms for yieldingly holding said valves upon their respective seats. Pivotally mounted at 17 upon the uprights 14 is a weighted arm 18 adapted to engage one or the other of the beveled projections 19 and 20 on the rocker for opening and closing from time to time the intake and outlet valves 10 and 11. The arm 18 is controlled partially by the weight 21, but is also provided with laterally projecting upper and lower fingers 22 and 23 adapted to be engaged by the angular projection 24 of the rod 25 extending from the bottom of the float 26, whereby movement of the float up and down by the rise and fall of liquid in the chamber 4 will cause the projection 24 to alternately engage said fingers and move the arm 18 into and out of engagement with the projections 19 and 20. An additional weight 27 is carried by the arm 18 for counter-balancing the fingers 22 and 23 and a stop projection 28 is mounted upon said weight for engaging the upright 14 to limit the movement of the arm in the direction of the valve 10. Likewise, a stop projection 29 is carried by the finger 23 for engaging the upright 14 to limit the movement of said arm in the direction of the valve 11. The normal position of the valve controlling arm 18 is shown in Figure 1 in which said arm is in contact with the projection 19 of the rocker 12 to hold the inlet valve 10 closed and the outlet valve 11 open. With the valves in this position the engine is using gasolene from the chamber 5 which is constantly being refilled by the flow of the liquid from the main chamber 4, thereby causing the descent of the float 26 until such time as the projection 24 engages the finger 23 and moves the arm 18 from the beveled projection 19 to the opposite beveled projection 20 to release the intake valve and close the outlet valve. During this operation the weight 21 is carried past the center of the pivot 17 and through the action of gravity serves to quickly throw the arm 18 into engagement with the projection 20, at which time the spring on the valve 10 also serves to actuate the rocker to elevate one side thereof and lower the other to close the outlet valve. The outlet valve will, of course, remain closed a very short time, only long enough to allow sufficient gasolene to flow into the chamber 4 from the tank 1 to elevate the float from the position shown in Figure 3 to that shown in Figure 1, which amount in the present instance, is preferably fixed at one-twentieth of a gallon. Elevation of the float from the position shown in Figure 3 to that shown in Figure 1 will cause the projection 24 to engage the finger 22 and move the arm 18 to return the intake valve 10 to closed position. Projecting from the top of the float is a rod 30 guided in a hollow projection 31 carried by the head 32 which is preferably screwed upon the upper end of the tank 2 for closing the same. The head carries an upright 33 at one side of which is mounted a bracket 34 insulated from the upright by an insulating block 35.

Pivoted upon the bracket 34 at 36 is an inwardly extending bar 37 normally resting upon a stop pin 38 secured to the bracket 33 as shown in Figure 1 and pivotally mounted at 39 upon the inner end of said bar is a movable contact 40 from which extends an arm 41 carrying at its outer end a pin 42 with which one end of a coil spring 43 is connected, the other end of the spring being secured to a projection 44 on the upright 33. A stop 45 is carried by the bar 37 to engage the underside of the arm 41 for limiting the downward movement of the same. Rigidly connected with the movable contact 40 and arm 41 is a trip bar 46 provided with a shoulder 47 arranged to engage the insulating member 48 on the float rod 30 when the float is in its lowermost position as shown in Figure 3 and also when the float is being elevated by the filling of the chamber 4. The upward movement of the float carries the contact 40 into engagement with the adjustable contact 49 on the plate 50 as indicated by dotted lines in Figure 1, said plate being supported upon and insulated from the upright 33 by the block 51. As the movable contact 40 engages the relatively fixed contact 49 current furnished by the battery 52 will flow through said contacts by way of the conductors 53 and 54 and magnet 55. When the movable contact 40 strikes the contact 49 the trip bar 46 will disengage the insulating member 48 by reason of the upward pressure exerted by the float and the spring 43 will return the parts to their normal position as shown in Figure 1. Thus the circuit containing the magnet 55 will only be closed momentarily for actuating the counter or registering mechanism in a manner which will presently be explained. It will be understood that with the parts in the position shown in Figure 1 downward movement of the float will cause the insulating member 48 to ride over the trip 46 and allow the float to return to the position shown in Figure 3.

Figure 4:
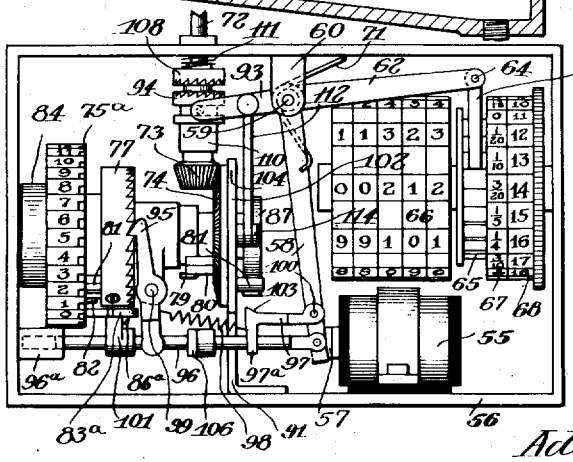
Figure 4 is a view similar to that shown in Figure 2 illustrating the position the counter operating mechanism will assume when actuated by the solenoid.
Figure 5:
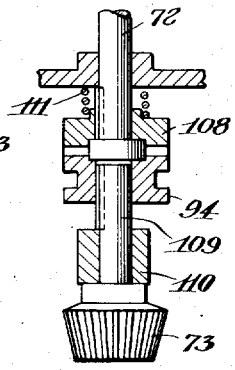
Figure 5 is an enlarged detail sectional view through the clutch mechanism shown in Figure 4.

The magnet 55 is mounted upon one of the walls of the register mechanism casing 56 as shown in Figures 2 and 4. In line with the magnet is an armature 57 on the end of a bell-crank arm 58 projecting from a support in the form of a shaft 59, the opposite ends of which are journaled in the upper and lower bearings 60 and 61 respectively (Fig. 7). Projecting from the support 59 is an arm 62 upon the outer end of which a pawl 63 is pivotally mounted at 64 for engaging and actuating the ratchet wheel 65 in one direction, the wheel being operatively connected with a system of counters or registering members indicated at 66, 67 and 68, each preferably mounted upon the shaft 68[a] carrying the ratchet wheel 65. The adding counter 66 is adapted to register the total number of gallons of fuel fed to the engine through the measuring tank 2, while the subtracting counter 68 on which the numerals are reversed is arranged to be set when the tank is filled to indicate the number of gallons placed therein and while the fuel is being used said counter is moved in the same direction as the adding counter to register the number of gallons remaining in the tank at any given time. The counter wheel 67 is divided into fractional parts of a gallon, each division preferably representing one-twentieth of a gallon and for every revolution of said wheel the wheel 68 will be advanced one step to subtract the gallon previously used from the supply in the main tank, while at the same time the wheel 66 of lowest order is being moved to indicate an addition of one gallon to the total number used. The counter or registering wheels 67 and 68 are visible through the window 69 while the registering wheels 66 are read through the window 70. The valve 10 is arranged to be opened by the descent of the float for the use of every one-twentieth of a gallon of fuel although the controlling mechanism may be arranged to dispense any other desired or predetermined amount. The counter wheel 67 will of course be advanced one step every time the magnet is energized through the closing of the switch by the rise of the float in the tank 4. The pawl 63 is arranged to ride over one of the teeth or notches of the ratchet wheel 65 each time the magnet is energized, and when the circuit is broken the pawl is moved inwardly to rotate or advance the counter wheel 67 one step, the return of the bell-crank and pawl being effected by the action of the coil spring 71 which is adapted to exert pressure upon the arm 58 of the bell-crank to return the same to normal position.

The mechanism for determining the ratio in miles traveled per gallon of gasolene used is mounted in the casing 56 and is connected with and operated partially by the bell-crank which operates the registering mechanism already described. In carrying out this feature of the invention I employ a drive shaft 72 adapted to be driven through a chain of reducing gears by a movable part of the vehicle (not shown) for rotating the pinion 73 to drive the gear wheel 74 at an extremely slow rate of speed, whereby the actuating wheel 75 rotatably mounted on the shaft 76 for moving the indicating ring 75ª, may be driven by said gear at the same slow rate of speed, or in other words, at a rate in the present instance sufficient to cause said wheel to make two-thirds of a revolution for each mile traveled by the vehicle. Thus, if the indicating ring is provided with numerals running from 0 to 30 and said ring is moved to indicate "20" the driver will know that he has traveled one mile, or if it indicates "17", he will know that he has traveled seventeen-twentieths of a mile.

Movement is imparted to the actuator 75 from the continuously rotating driving shaft 72 by an interposed arrangement of parts whereby it is possible to lock the indicator in a given position to which it may be adjusted and later release the indicator and readjust it at the completion of a fuel consumption period.

Figure 15:
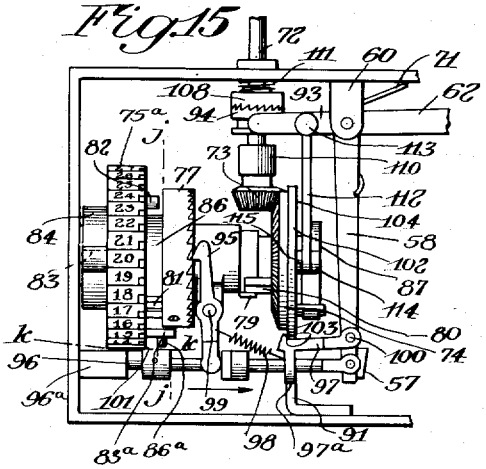
Figure 15 is a view similar to Figure 2 with the pawl controlling the intermediate drive wheel moved to initial locking position.
Figure 16:
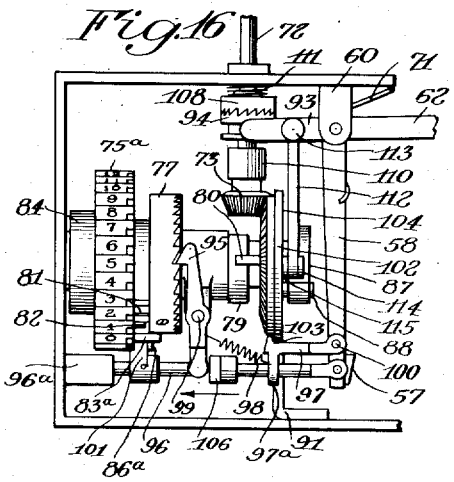
Figure 16 is a similar view showing the relation of the parts after the indicating wheel has been released and said parts returned from the position shown in Figure 4 to substantially normal position.

The gear wheel 74 is adapted to drive the ratchet wheel 77 on the rotatable sleeve 78 through the projections 79 and 80, the former of which is carried by the sleeve and the latter by the gear. The ratchet wheel 77 is provided with a split projection 81 on its outer vertical face which is adapted to engage a pin 82 on the inner plate 76ª of the ring controlling or actuating wheel 75 whereby the latter is rotated in a forward direction. The controlling or actuating wheel 75 comprises the plates 76ª, 77ª (Fig. 14) having a pin 83 projecting therethrough upon the outer portion of which is connected the end of a coil spring 84, the inner end of the spring being fixed upon a boss or projection 85 extending inwardly from one of the end walls of the casing, said spring serving to return the wheel 75 to zero position after the ratchet wheel 77 has been rotated and released and its projection 81 released the pin 82 of wheel 75 from the position to which said wheel has been advanced by the pin 81 in a manner which will presently be explained. Secured upon and projecting inwardly from the indicating ring 75ª is a pin 78ª (Fig. 13) extending between the plates 76ª and 77ª upon which said ring is movable. The plate 76ª is provided with a hub 79ª upon which is secured the inner end of a coil spring 80ª, the outer end of which is connected with a pin 78ª as shown in Figure 13. The indicating or registering ring 75ª is held upon the actuating wheel 75 by means of the central rib portion 81ª of the ring which extends between the plates 76ª and 77ª as shown in Figure 7. The numerals upon the indicating ring are visible through the window 82ª as shown in Figure 6. A spring 86 (Fig. 9) is provided for returning the ratchet wheel 77 to normal position, said spring having its outer end secured upon the split projection 81 on the wheel and its inner end upon the shaft 76. The gear wheel 74 is also arranged to be returned to zero position at the proper time by the action of the coil spring 87, the outer end of which is secured to a pin 88 on the outer face of the gear 74 while the inner end of the spring is secured to the inner end of the shaft 76. The sleeve 78 is rotatably mounted upon a bearing 89 located between the ratchet wheel 77 and the gear wheel 74 as shown in Fig. 7. The gear wheel is provided on its periphery with a stop projection 90 normally held at zero position in contact with a fixed member 91 by the action of the spring 87 as shown in Figure 11 whereby the gear is always brought to proper position when returned by said spring. Each of the wheels 74, 75 and 77 is free to rotate upon the shaft 76 which is fixed upon the boss 85 by means of the pin 92 as shown in Figure 7. Means for effecting the release of the gear wheel 74, the ratchet wheel 77 and actuating wheel 75 is controlled and operated by the bell-crank arms 58 and 93 which are actuated at the proper time by the magnet 55. These wheels are all driven forwardly at the same rate of speed by the pinion 73 when starting from zero position until the clutch member 94 is moved inwardly by the arm 93 when the magnet is energized. At this time the gear 74 is returned to zero position by the action of the spring 87, but the ratchet wheel 77 is held against backward rotation by having the pawl 95 thrown into engagement therewith as shown in Figures 4 and 15. This is accomplished by movement of the sliding rod 96, actuated by the magnet and by the action of the bell-crank arm releasing latch 97 held against inward movement on the rod 96 by the hooked extension 97[a] which exerts a pull upon the spring 98 to move the pawl 95 upon its pivot 99, said releasing latch being pivotally connected at 100 to said bell-crank arm 58. The sliding rod 96 at its outer end is seated in the projection 96[a] and carries a dog 101 which is adapted to engage a series of notches formed in the side face of the indicating ring 75[a], said dog serving to normally prevent the rotation of the ring in either direction.

Figure 17:
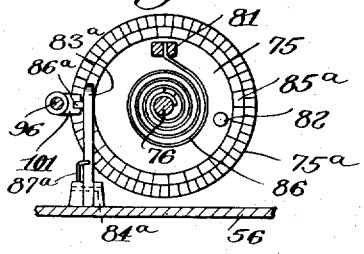
Figure 17 is a sectional view taken on line *j—j* of Figure 15.
Figure 18:
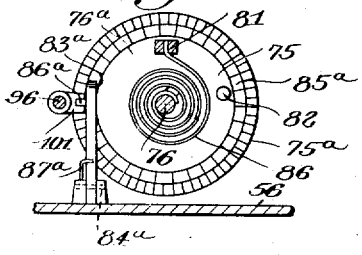
Figure 18 is a similar view showing the operating wheel for the indicating ring moved slightly in advance of the position shown in Figure 17.
Figure 19:
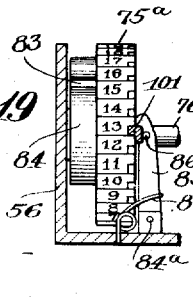
Figure 19 is a sectional view taken on line *k—k* of Figure 15, showing the locking pawl for the indicating ring held in locking engagement therewith by the pawl controlling the operating wheel.
Figure 20:
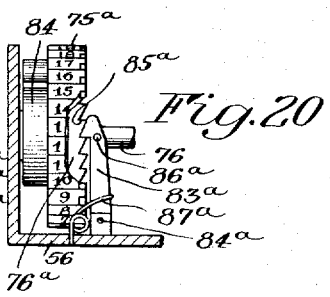
Figure 20 is a view illustrating the manner of locking the operating wheel, a portion of the indicating ring being broken away to more clearly illustrate the relation of the parts.

Movement of the sliding rod toward the magnet will cause the pawl 95 to be thrown into engagement with the ratchet wheel 77 before the dog 101 disengages the ring 75[a] and until its pin 78[a] engages the pin 83 on wheel 75, a pawl 83[a] disengages the actuating wheel 75. The pawl 83[a] carries a lateral projection 86[a] which is mounted in the path of the dog 101 (Figs. 17, 18 and 19) whereby movement of the pawl is effected in one direction by the dog, said pawl being moved in an opposite direction by a spring 87[a]. Release of the actuating wheel 75 by the pawl 83[a] will allow the spring 84 to rotate said wheel backwardly until the pin 82 engages the projection 81 on the ratchet wheel 77, it being assumed that the latter is locked before the pin is moved far enough to engage said projection. However, if the vehicle should travel a greater distance for the next one-twentieth of a gallon of fuel used than it did on the last, then the ratchet wheel 77 would move forwardly a greater distance than it previously did and in this case the projection 81 coming in contact with the pin 82 would cause the wheel 75 to advance farther than it was previously advanced and thereby allow the indicating ring after being released by dog 101 to be advanced by the spring 80[a] (until its pin 78[a] engages the pin 83 or wheel 75) to indicate a new and greater ratio in miles per gallon of fuel consumed. Release of the armature 57 and bell-crank arm 58 will of course, normally allow the sliding rod 96 to return to its normal position under the influence of spring 71 as shown in Figure 2, but as it is necessary to prevent movement of the pawl 95 to release the ratchet wheel before the gear wheel 74 reaches zero position the clutch controlling or releasing latch 97 has been provided and serves the double purpose of actuating the pawl 95 to lock the ratchet wheel as well as to prevent the return of the rod and closing of the main driving shaft clutch 94 before said gear 74 is moved back to zero position. It will be understood that the inner edge of the latch member 97 normally rides upon the peripheral flange 102 of the gear wheel 74 while the gear is being rotated forwardly and that when the armature 57 is attracted the beveled end 103 of said latch rides over the flange and is drawn inwardly by the action of the spring 98 as shown in Figure 4. When the armature is released the spring 71 will move the bell-crank 58 until the free end of the latch member strikes the face 104 of the gear wheel, which will be previous to the engagement of the outer end of the pawl 95 by the operating projection 106 on the rod 96. In this way the ratchet wheel is held against release until the gear wheel 74 has been rotated back to zero position, at which time the notch 107 in the flange of the gear wheel will have been moved opposite the latch member and the latter, together with the bell-crank arms 58 and 93, will be free to return to normal position to cause the return of the clutch member 94 into engagement with the clutch member 108 on the shaft 72. Return of the sliding rod at this time will of course, cause the disengagement of the pawl 95 to release the ratchet wheel and the locking of the registering ring 75[a] by the dog 101 in whatever adjusted position said ring may occupy and also the locking of the actuating wheel 75 by the pawl 83[a].

It will be understood that the clutch member 94 is slidably mounted and keyed upon the short shaft 109 which is rotatable upon the bearing 110 and that the clutch member 108 is slidably mounted and keyed upon the driving shaft 72. Mounted upon the shaft 72 between the clutch member 108 and one of the side walls of the casing 56 is a coil spring 111 which will permit said clutch member to yieldingly move out of operative engagement with the member 94 when the vehicle is driven backwardly, thereby rendering the registering mechanism inoperative during the backward drive of the shaft 72, said spring serving to return the clutch member to operative position as soon as the driving shaft is reversed by the forward drive of the car.

In order to prevent the registering mechanism from registering at such times as the machine may be running down grade with the power cut off and the consumption of fuel discontinued I provide a clutch moving member or link 112, one end of which is pivotally connected at 113 to the bell-crank arm 93 and the other at 114 to an arm 115 (Fig. 11) rotatably mounted on the shaft 76. If the motor is not consuming fuel the float can not, of course, be moved to close the switch and cause the energization of the magnet, but if the vehicle travels far enough while the engine is not working to move the pin 88 around from the position shown in Figure 11 to the other side of the arm 115 the latter will be operated to move the link 112 and release the clutch 94 thereby discontinuing the rotation of the gear wheel 74. However, the moment the clutch 94 is released the free end of the releasing latch 97 is moved over and drawn into contact with the face 104 of the gear flange 102 by the spring 98 to prevent the immediate closing of the clutch by the spring 71 before the gear wheel is returned to zero position, which will be done by the spring 87 immediately upon the opening of said clutch. By opening and closing the clutch in this manner the bell-crank arm 58 will be moved toward the magnet 55 only as far as is indicated by dotted lines in Figure 2, a distance not great enough to cause the pawl 63 to move from one of the notches on the ratchet wheel 65 to another and consequently not far enough to actuate said wheel when the bell-crank arm 62 is returned to normal position.

In the operation of the device, assuming that the gear and ratchet wheels together with the indicating ring and the wheel for actuating the same are all standing at zero position when the vehicle starts, then the gear 74, ratchet wheel 77 and actuating wheel 75 will all be driven forwardly at the same rate of speed while the indicating ring 75ª will be held at zero position by the dog 101. During the advancement of said wheels the coil springs for returning them to zero position will be wound up, together with the spring 80ª for actuating the indicating ring 75ª when the latter is released by the dog 101. When the motor has consumed a unit of fuel, in the present instance, one twentieth of a gallon, the valve 10 will be opened by the descent of the float to allow another unit of fuel to be discharged into the tank 4 to raise the float and momentarily close the electric switch to cause the energization of the magnet 55. Energization of the magnet will attract the armature 57 and operate the bell-crank 58 to retract the pawl 63 for operating at the proper time the ratchet wheel 65 and wheel 67 for subtracting the unit of fuel used from the amount indicating the quantity placed in the tank. At the time the bell-crank arm 58 is drawn toward the magnet, the clutch members 94 and 108 are separated and the latch 97 is pulled beyond the rim of gear 74 in position to prevent the return of the rod 96 until after the gear wheel 74 returns to zero positon. In the meantime the pawl 95 engages and locks the ratchet wheel 77 in whatever position it has been moved and after it is locked the pawl 83ª, retracted by the dog 101, will release the actuating wheel 75 by disengaging the teeth of the plate 76ª, permitting the actuating wheel 75 to return to its normal position under the action of its restoring spring 84, when the ratchet wheel 77 is released. It will be recalled that the actuating wheel 75 is at this time advanced and held in the advanced position by the lug 81 on the ratchet wheel 77 engaging the pin 82. These parts retain this position while the ratchet wheel 77 is locked by its pawl 95, which occurs upon the outward movement of the rod 96. Upon the return movement of said rod, the dog 101 and the pawl 83 again lock said ring and actuating wheel in their newly adjusted positions. After the indicating ring has been once advanced it may never return to zero position, although said ring and its actuating wheel are always capable of yieldingly moving in either direction of rotation. When the dog 101 releases the ring, standing now in the first instance at zero position, the spring 80ª will move said ring until the pin 78ª engages the stop 83 within the actuating wheel 75. Thus the ring will be rotated from zero position to a position to indicate the ratio in distance traveled per unit of fuel consumed, or say one mile for a twentieth of a gallon, which corresponds to the position of the ring as shown in Figure 2. As soon as the gear 74 is returned to zero position the latch 97 registering with the notch 107 (Fig. 11) permits the spring 71 to move the bell-crank arm 58 to return the sliding rod 96 to normal position, at which time the dog 101 engages and locks the indicating ring and the pawl 83ª under the action of the spring 87ª and engages the teeth 85ª of the actuating wheel to prevent backward rotation of the same. As soon as this is done the projection 106 on the sliding rod operates the pawl 95 to release the ratchet wheel 77 to allow the same to be returned to zero position from whence it again starts to slowly revolve under the action of the driving member 74. With the clutch closed the gear and ratchet wheels will again begin to advance and should the vehicle travel farther on the next unit of fuel consumed than it did on the first the projection 81 on the ratchet will move into engagement with the pin 82 and begin to move the actuating wheel 75 to a new and advanced position, while the indicating ring is still held in its position of previous adjustment.

As soon as the magnet is again energized and the dog 101 moved out of engagement with the indicating ring the spring 80ª will advance the ring until the pin 78ª moves into contact with the stop 83. If, however, the vehicle does not travel as far on the second unit of fuel as it did on the first, then the ratchet wheel 77 will be halted before the projection 81 comes in contact with the pin 82, and in this case the actuating wheel 75 when released will move backwardly until said pin 82 strikes said projection 81 where it is held. In its retrograde movement the actuating wheel carries the registering ring with it through contact of the pins 83 and 78[a] thus causing the ring to assume the proper position to indicate the ratio in miles per gallon consumed by the motor between the first and second or any other two consecutive operations of the magnet 55.

In applying the invention to power driven machines other than vehicles the shaft 72 may be geared to the driving shaft of the engine in such a manner that for every twenty revolutions of the engine shaft said shaft 72 will make two-thirds of a revolution and thereby cause the indicating ring 75[a] to register the numeral 20 as shown in Figure 2. These proportions are, of course, arbitrarily assumed, it being understood that any other desired proportions may be substituted.

I claim as my invention:

1. In combination, an indicator, means including an actuating member and a rotatable member for driving said indicator from a predetermined starting point, said rotatable member being adapted to adjust said actuating member, means for restoring said members to said starting point, locking devices normally engaging the actuating member and the indicator, and a locking device for the rotatable member which is normally disengaged therefrom, a periodically operated release means arranged to disconnect the driving means and the normally engaged locking devices and to cause the engagement of the last mentioned locking device with the rotatable member, and means for moving the indicator relatively to its actuator when it is unlocked.

2. In an indicating apparatus, the combination with two rotatable members each adapted to be operated from a predetermined point, the second being arranged to be advanced by the first, a driven element for rotating the latter comprising a clutch, and an indicator, of an actuating member for the latter adjusted by the second member, means for restoring the two rotatable members and the actuating member, locking devices normally engaging the actuating member and the indicator, and a locking device for the second mentioned member which is normally disengaged therefrom, a periodically operated release means arranged to disconnect the clutch of the driven element and the normally engaged locking devices and to cause the engagement of the last mentioned locking device with said second mentioned member, and means for moving the indicator relatively to its actuator when it is unlocked.

3. In an indicating apparatus, the combination with a rotatable member adapted to be operated from a predetermined starting point, means for driving it comprising a clutch, and an indicator, of an actuating member for the latter, connecting means between said indicator and actuator for moving the former subsequent to the adjustment of the latter, and locking devices normally engaging the indicator and its actuator arranged to hold the indicator stationary and permit the actuator to move only in a forward direction, another normally in operative locking device for the rotatable member, and a periodically operated release means arranged to disconnect the clutch, disengage the locking devices of the indicator and its actuator, and throw the normally inoperative locking device into engagement with the rotatable member, and means for restoring the rotatable member when its locking device is released.

4. In an indicating mechanism, the combination with a rotatable member having ratchet teeth, means for driving the member from a predetermined position in one direction embodying a clutch, a spring for restoring said member and a pawl adapted to cooperate with the ratchet teeth to prevent the retrograde movement of the member but normally occupying an inoperative position, an indicator, means for locking it, an actuating member for the indicator having ratchet teeth and arranged to be driven in one direction by said rotatable member, a spring for restoring it, and a pawl normally engaging said teeth to restrain it against said spring action, a periodically operated release means arranged to disconnect said clutch, and unlock the indicator and its actuator and throw the first mentioned pawl into engagement with the rotatable member.

5. In an indicating mechanism, the combination with a rotatable member, a spring normally holding it in engagement with a fixed stop, means for driving the member against the spring tension embodying a clutch, and a locking device for retaining the member in its advanced position, of an indicator, an actuating member therefor driven by the rotatable member, and a spring for restoring the actuating member, a spring tensioned by the movement of the latter for moving the indicator, a locking device normally preventing the movement of the indicator, and locking means engaging the actuator and normally operating to prevent retrograde movement imparted by the action of its spring, a release means arranged to disengage said clutch, disconnect said indicator and actuator locking means and throw the locking means of the rotatable member into engagement therewith.

6. In combination, an indicating member, means including an actuating member and a rotatable member for driving said indicating member from a predetermined starting point, said rotatable member having means to advance and to hold said actuating member, means for restoring said members to said starting point, a movable member, a reciprocating member connected therewith arranged normally to hold the indicating member during the advance movement of the rotatable member and the actuating member, means for moving said movable member periodically to release the indicating member, and to disconnect said driving means, means controlled by said movable member for releasably locking the rotatable member, means controlled by the actuating member for moving the indicating member to proper indicating position when released by the reciprocating member, and means for returning said movable member to normal position to cause the return of the reciprocating member to lock the indicating member.

7. An apparatus of the character described, comprising a continuously movable driven element, a member connected to be moved thereby a partial revolution in one direction from a fixed point, and periodically operated release means, a second member arranged to be moved from a predetermined point by the first mentioned member, an actuating member arranged to be operated by the second member, and a graduated indicating member, a movable arm, a reciprocating member connected therewith arranged to normally hold the graduated member during the advance movement of the first and second mentioned movable members and the actuating member, means controlled by the release means for moving said arm periodically to release the indicating member, means governed by the arm for discontinuing the movement imparted to the first mentioned member, means for restoring the latter to its predetermined starting point, means controlled by the arm for locking the second mentioned movable member until the first is returned to said starting point, means carried by the second mentioned movable member for holding the actuating member during the movement of the reciprocating member in a direction to cause the release of the graduated indicating member, means controlled by the actuating member for moving the indicating member to proper indicating position when released by the reciprocating member, means for returning the arm to normal position to cause the return of the reciprocating member to lock the indicating member, and means for returning said second mentioned movable member to its predetermined starting point.

8. A registering mechanism comprising a rotatable indicating member, brake means normally holding said member against rotation in either direction, setting mechanism having a resilient actuating connection with said member, resilient means for moving said mechanism in one direction, releasable driving means for moving said mechanism in the other direction, and control means for intermittently actuating said brake means to release and relock said indicating member and for releasing and reengaging said driving means.

9. A registering mechanism comprising a first rotatable member, driving means having a releasable connection with said first member for advancing the same, a spring for returning said first member to starting position, a second rotatable member, cooperating means on said first and second members for advancing the latter during advance of said first member, a spring for returning said second member, a rotary indicating member having releasable means normally holding the same against rotation in either direction, a spring connecting said indicating and second members for advancing the former when released to correspond with advance of the latter, cooperating parts on said indicating and second members for returning the former when released during return of the latter, and control means for periodically releasing said holding means and driving means.

10. In an indicating mechanism, the combination with a driving member rotating in one direction, an oscillatory indicator, a device for locking the latter in adjusted position, and a spring tensioned to rotate the indicator in the direction of movement of the driver, of a rotatable member rotated in one direction by the driver, an actuating member rotated in the same direction by the rotatable member and tension springs for independently rotating said members in the other direction, cooperating sets of stops between said actuating member and said rotatable member and indicator, and means for successively releasing said locking device and disengaging the driving member and rotatable member.

11. In an indicating device, the combination with a driving device embodying a clutch, a rotatable member rotated by the driving device in one direction and an actuating member moved in the same direction by the rotatable member, of springs for independently rotating said rotatable and actuating members in the opposite direction, an indicator mounted for independent oscillatory movement, a spring for rotating it in the direction of rotation of the driving device, cooperating stops on the indicator and actuating member for limiting the spring impelled movement of the indicator, a locking device normally engaging the indicator, and mechanism for releasing the indicator locking device and opening the driving device clutch.

ADOLPH STUBER.